United States Patent [19]
Johnson et al.

[11] Patent Number: 5,463,855
[45] Date of Patent: Nov. 7, 1995

[54] SNAP-ON HEIGHT ADJUSTMENT SPACER CLIPS FOR MOWER DECK WHEEL SPINDLES AND THE LIKE

[75] Inventors: Eric Johnson, Salina; Gail A. Lloyd, Solomon; R. Nathan Massey, Salina, all of Kans.

[73] Assignee: Great Plains Manufacturing, Incorporated, Assaria, Kans.

[21] Appl. No.: 197,402

[22] Filed: Feb. 16, 1994

[51] Int. Cl.⁶ ................................................ A01D 67/00
[52] U.S. Cl. ................................ 56/17.2; 16/19; 56/322; 280/43
[58] Field of Search ...................... 56/17.1, 17.2, 56/322; 16/19, 30; 280/43

[56] References Cited

U.S. PATENT DOCUMENTS

| | | |
|---|---|---|
| 359,355 | 3/1887 | Hinchman . |
| 1,069,340 | 8/1913 | Lee . |
| 1,482,954 | 2/1924 | Tideman ........................... 280/43 X |
| 1,491,097 | 4/1924 | Hoffman . |
| 1,896,234 | 2/1933 | Hathorn ............................... 56/322 |
| 2,485,312 | 10/1949 | Powell ............................. 56/322 X |
| 2,575,521 | 11/1951 | Ireland . |
| 2,828,968 | 4/1958 | Engler ................................ 280/43 |
| 3,008,772 | 11/1961 | Helsel . |
| 3,128,087 | 4/1964 | Hughes . |
| 3,802,173 | 4/1974 | Opitz ............................. 56/17.2 X |
| 3,806,150 | 4/1974 | Peart et al. . |
| 4,073,345 | 2/1978 | Miller ................................ 172/413 |
| 4,098,348 | 7/1978 | McChesney ........................ 172/406 |
| 4,248,034 | 2/1981 | Jackson et al. ..................... 56/17.2 |
| 4,402,686 | 9/1983 | Medel . |

Primary Examiner—George A. Suchfield
Attorney, Agent, or Firm—Hovey, Williams, Timmons & Collins

[57] ABSTRACT

An improved snap-on height adjustment spacer clip is provided for height adjustment of wheeled frames including at least one ground-engageable wheel assembly. The snap-on clip includes a pair of mutually opposed, resiliently spreadable arms integrally connected at one end and disconnected at the opposite end. The clip arms are sized for embracing the spindle portion of the wheel assembly when installed, and are sized to permit the arms to yieldably flex toward and away from one another as the spindle passes transversely between the arms during installation and removal of the clip. The clip preferably includes a pair of mutually opposed, resiliently compressible hand knobs for use in clip installation and removal.

19 Claims, 2 Drawing Sheets

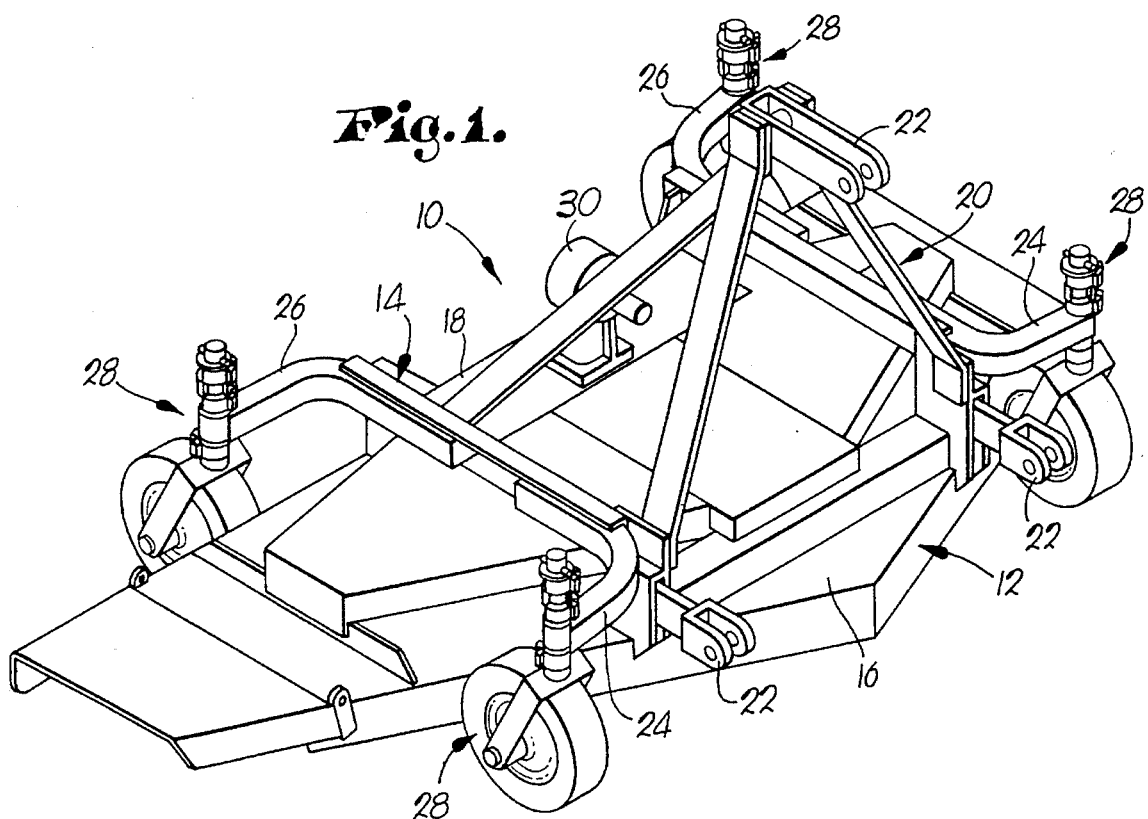
Fig.1.
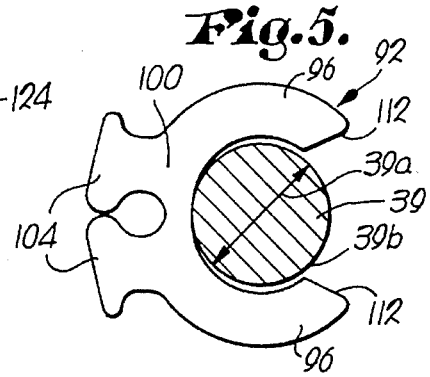
Fig.2.
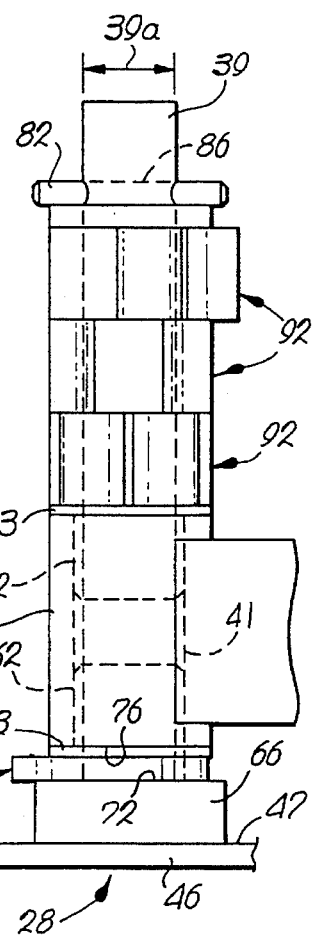
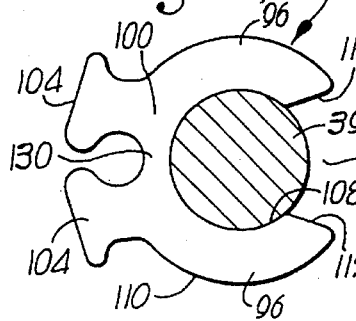
Fig.3.
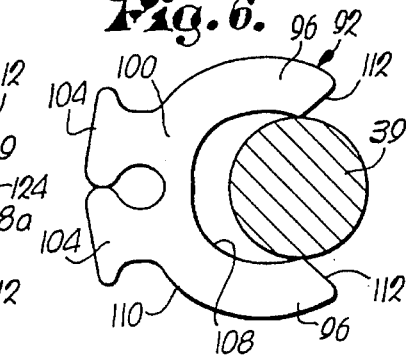
Fig.4. Fig.6.

SNAP-ON HEIGHT ADJUSTMENT SPACER CLIPS FOR MOWER DECK WHEEL SPINDLES AND THE LIKE

BACKGROUND OF THE INVENTION

1. Field of the Invention

This invention relates to a snap-on spacer clip advantageously designed for quick height adjustment of a wheeled frame, such as a mower deck, having wheel spindles. More particularly, it is concerned with such a snap-on spacer clip which is improved by the provision of uniquely shaped, spreadable arms integrally connected at one end and disconnected at an opposite end to allow quick clip installation on and removal from a mower deck caster wheel spindle, thus eliminating the need to disassemble the spindle from the mower deck when adjusting deck height.

2. Description of the Prior Art

The mower deck mentioned is the type adapted for releasable attachment to and use with a tractor draw bar or three-point hitch. Typically, such mower decks are supported by caster-like wheel assemblies which include a spindle rotatably received by a sleeve (or bushing housing) associated with a frame of the mower deck. The caster wheel assemblies are adapted to rotate about a vertical axis for support of the mower deck assembly when in use. The caster wheel assemblies are also commonly used to adjust and maintain the height of the mower deck in relationship to the surface being mowed.

The present and commonly accepted method of achieving cutting or height control in the mowing decks (as well as other cutting or leveling equipment) is by installation or arrangement of circular spacer collars on the spindle of the caster wheel assembly. In such configurations, the spacer collars are installed on the spindle between a spindle lower shoulder (or collar) and an upper shoulder associated with a sleeve attached to the mower deck. Such collar installation is disadvantageous because it requires that the spindle be removed from its housing so circular collars may be slipped on or off the free end of the spindle. Removal of the spindle, in turn, requires that the mower be mechanically lifted high enough to allow vertical downward clearance of the wheel and spindle below the spindle bushing housing, typically requiring a distance of ten to twelve inches.

An additional disadvantage is that the spindle shaft is normally coated with grease and has a tendency to attract dirt or other contaminants when disassembled, leading to premature abrasion on wear surfaces if not removed before reassembly. Such abrasion is most pronounced when plastic spindle bushings are used. Premature abrasion tends to cause seizure of the spindle and disable the spindle's ability to swivel within the sleeve when in use.

Another disadvantage of conventional deck height adjustment is that the wheel and spindle assembly can weigh fifteen pounds or more, making the handling during disassembly and assembly difficult.

Yet another disadvantage is that adjustment has to be made to four spindles (as is often the case because many decks employ four caster wheel assemblies), the adjustment time can be as much as four to five minutes, assuming no more than two collars per spindle are moved, and further assuming that no parts are lost. The problem is amplified if adjustments have to be made to caster wheel assemblies on multi-sectioned mowers. On three-deck mower assemblies typically including as many as twelve spindles, for example, twelve to twenty minutes is often required to make height adjustments. The problem is further amplified if adjustments have to be made several times per day, as is the case when operating environments switch back and forth between lawns or pastures, and ditches, or the like.

SUMMARY OF THE INVENTION

The present invention overcomes the problems outlined above and provides a snap-on height adjustment spacer clip including a pair of mutually opposed, resiliently spreadable arms integrally connected at one end and disconnected at the opposite end. The clip arms are sized for embracing the spindle portion of the caster wheel when the clip is installed thereon, and yet are sized to permit the arms to yieldably flex toward and away from one another as the spindle passes transversely between the arms during installation and removal of the clip. By employing the clip of the invention, the mower deck height can be adjusted quickly and without the need to remove the spindle from its housing.

The clips are configured to be installed between a lower shoulder of a caster wheel spindle and an upper shoulder of a spindle sleeve (associated with the mower deck). So installed, the clips establish and maintain the desired distance between the shoulders against downward movement below a selected deck height position.

BRIEF DESCRIPTION OF THE DRAWINGS

FIG. 1 is a perspective illustration of a mower deck showing the caster wheel assemblies with snap-on spacer clips installed on the spindles.

FIG. 3 is an enlarged perspective view of a snap-on clip.

FIG. 4 is an enlarged, cross-sectional top view showing a snap-on clip installed on the spindle.

FIG. 5 is an enlarged, cross-sectional top view of a snap-on clip showing the expansion of the arms as they are cammed by the periphery of the spindle.

FIG. 6 is an enlarged, cross-sectional top view of a snap-on clip showing the expansion of the arms as caused by the finger squeeze knobs to facilitate installation and removal.

FIG. 7 is an enlarged, cross-sectional top view of a snap-on clip showing the relative angles between the arm edges and the mouth center, and also showing other relative dimensions.

DETAILED DESCRIPTION OF THE PREFERRED EMBODIMENT

Figure 2:
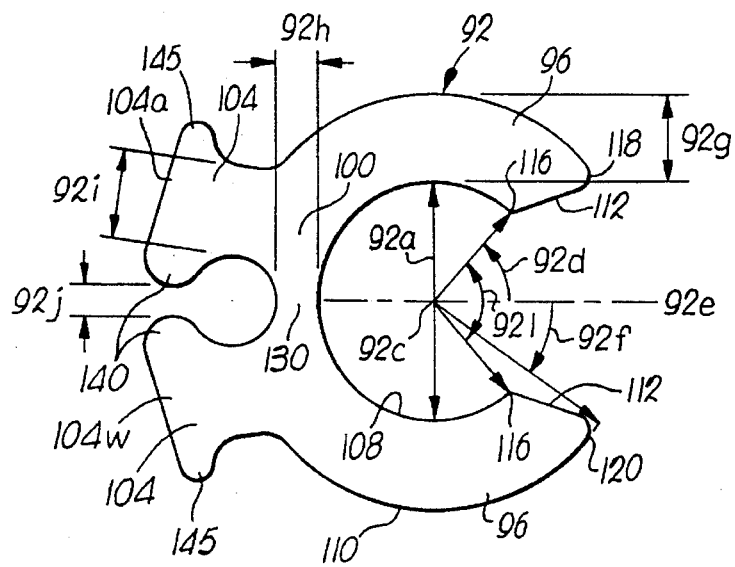
FIG. 2 is an enlarged, fragmentary, side elevational view of the caster wheel spindle showing a snap-on clip installed on the spindle between the upper shoulder of the frame and lower shoulder of the spindle collar.

Turning now to the drawings, a flat deck grooming mower assembly 10 is shown which generally includes a mower deck 12 carried by a generally box-shaped, height-adjustable, wheeled frame 14.

As shown in FIG. 1, the frame 14 includes a front section 16 and a rear section 18. The frame front section 16 includes suitable clevis hitches 22. The clevis hitches 22 are sized for releasable attachment to a tractor three-point hitch assembly having an upper and a pair of lower connector links (not shown). Frame 14 further includes pairs of front and rear frame arms 24, 26 extending transversely outward from front and rear sections 16, 18, respectively. Caster wheel assemblies 28 are securely fastened to the outer ends of frame arms 24 and 26 by any suitable means. It will be apparent to those skilled in the art that a plurality of caster wheel assemblies 28 need not be used, but rather one caster wheel 28 can be used instead to support the mower deck 12.

The mower deck 12 includes a gear box 30 for the transmission of rotation motion of the tractor power take-off shaft (not shown) to the mower blades (not shown) disposed beneath the deck 12. The deck 12 is connected to the frame 14 by any suitable means and is positioned between caster wheel assemblies 28 attached to front and rear frame arms 24 and 26. So configured, the caster wheel assemblies 28 can be used to achieve cutting and height control in mowing.

Each caster wheel assembly 28 includes a wide gauge yoke 38, a spindle 39 and a spindle sleeve 40. The yoke 38 includes a pair of downwardly projecting arms 44 attached at their upper ends by a yoke transverse member 46 presenting an upper surface 47 extending therebetween. A wheel and tire assembly 50 is rotatably received between the pair of yoke arms 44 by any suitable fastener, which allows wheel rotation about a transverse axis extending between the lower ends of yoke arms 44. The spindle 39 is disposed centrally on and extends upwardly from the yoke transverse member 46 and has an outside diameter 39a and spindle periphery 39b. In the preferred embodiment, the spindle 39 is round in cross-sectional shape, but where appropriate, may have other cross-sectional shapes as desired or necessary (such as octagonal). As shown in FIG. 2, a spindle collar 66 is integrally disposed at the lowermost end of and is circumferentially received by spindle 39 and abuts against an upwardly presented face 47 of yoke transverse member 46. The spindle collar 66 presents an upwardly facing, lower shoulder 72. A retaining roll pin 82 is also provided to hold spindle 39 in place and is received by a retaining pin bore 86 disposed at the upper end of spindle 39.

The sleeve 40 is fixedly attached to outer ends of each frame arm 24 and 26 and presents a generally vertical bore 41 for receiving the spindle 39. A pair of spindle wear bushings 62, including a head portion 63, and an annular portion 64 (shown in phantom in FIG. 2) are disposed between the spindle 39 and sleeve 40. The lowermost portion of the sleeve 40 presents a downward facing, upper shoulder 76.

Spacer clips 92 of the instant invention are of general C-shape configuration in cross-sectional shape. Clips 92 are constructed of a material that is durable and highly resilient in operating conditions that include temperature variations between 0°–120° C., exposure to harsh chemicals, petroleum products (such as grease, oil, friction proofers), and the like, and to sun radiation (u.v. and infrared). Preferably, clips 92 are constructed of resilient and durable material having durameter values between about 80–87, such as rubber sold under Trademark "SANTOPRENE" (Grade 101-80; 101-87,201-80; 201-87) (made by Monsanto Chemical Company, Akron, Ohio) or equivalent. Clips 92 may advantageously be constructed of material having durameter values of between about 50–90.

Next, the invention will be discussed in terms of a clip 92 constructed with a material having a durameter value of about 87, unless otherwise indicated. Clip 92 advantageously includes a pair of mutually opposed, resiliently spreadable arms 96, a clip back portion 100 and, in the preferred embodiment, hand knobs 104. As shown in FIGS. 3–6, arms 96 are integral to and extend outwardly from clip back portion 100 and, together with back portion 100, present a generally C-shaped annular interior surface 108 and exterior surface 110. As shown in FIG. 7, interior surface 108 has a wrap-around circumference 108a configured so that clip 92 fits snugly on spindle 39, although complete surface-to-surface contact, while preferred, is not required. The circumference 108a is advantageously about 60–90% of the spindle circumference, and preferably is about 73% of the spindle diameter.

As shown in FIG. 3, the arms 96 present a top face 111 that provides a top load-bearing surface. Additionally, the arms 96 present a bottom face 113 that similarly provides a bottom load-bearing surface. Preferably, the top face 111 is substantially parallel to the bottom face 113, and both faces are flat.

Again, referring to FIG. 7, each arm 96 includes an outer end 112 which, in cross-section, presents an interior edge 116 and an exterior edge 120. The outer arm ends 112 cooperate to define and present clip mouth opening 124.

Reference is now made to certain angles for the purpose of describing structural characteristics of clip 92. As shown in FIG. 7, angle 92d is defined to mean the angle between radius through clip center 92c and interior edge 116 and radius through clip center 92c and mouth opening center 92e. Angle 92f is defined to mean the angle between radius through clip center 92c and exterior edge 120 and radius through clip center 92c and mouth opening center 92e. Angle 92l is defined to mean the angle of mouth opening 124 measured between radii through clip center 92c and interior edges 116 of each arm 96, as shown in FIG. 7.

The interior edge 116 is disposed on the interior clip surface 108 such that angle 92d is about 45°–60°, and in the preferred embodiment is about 48°–50°.

The exterior edge 120 is disposed on exterior clip surface such that angle 92f is about 35°–37°, and in the preferred embodiment is about 35°–40°.

Arms 96 have a thickness 92g which is about 25–40% of the clip internal diameter 92a, and in the preferred embodiment is about 25–45% of diameter 92a.

Center region 130 of back portion 100 is disposed between knobs 104 and thickness 92h of region 130 and is about 25–35% of clip internal diameter 92a.

Hand knobs 104, when included, are mutually opposed and extend radially outward from clip back portion 100 in a direction opposite arms 96 and terminate in end portions 104a. Width 92i of knobs 104 is about 25–33% of clip internal diameter 92a. Knobs 104 are separated by distance 92j which is about 10–20% of internal diameter 92a. Hand knobs 104 are provided with inwardly extending stops 140 and outwardly extending finger grips 145, each disposed at and integral to outer ends 104a, as shown in FIG. 7. Stops 140 are configured to prevent excessive flexure of clip center 92c when hand knobs 104 are squeezed together. Finger grips 145 facilitate gripping of clip 92 during removal from spindle 39.

Figure 8:
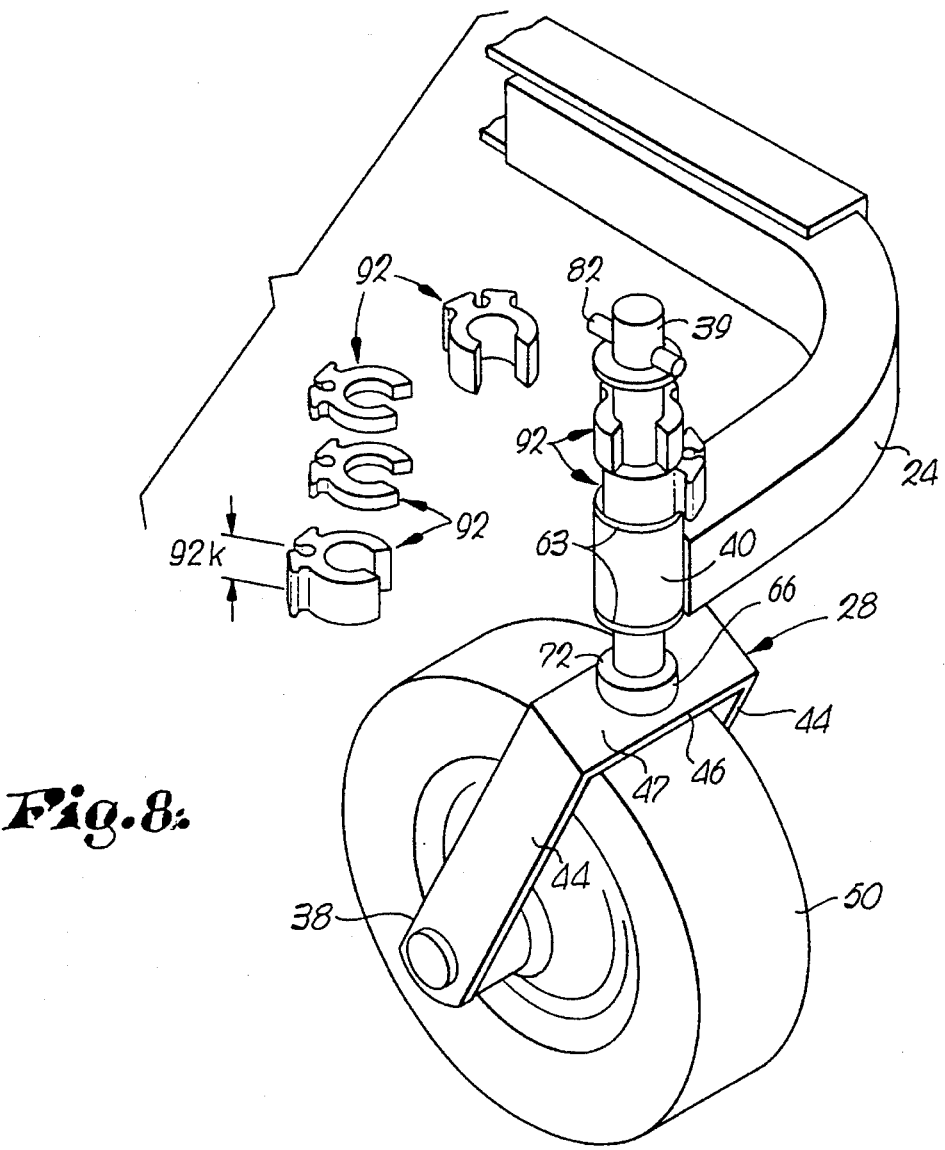
FIG. 8 is a perspective view of a caster wheel assembly showing snap-on clips of various heights and further showing snap-on clips mounted on the spindle above the lower shoulder of the spindle sleeve.

Referring to FIG. 8, clip height 92k may be of any height to achieve desired incremental adjustments. In the preferred embodiments, clips 92 are provided with clip heights 92k of 0.25 inch, 0.5 inch and 1 inch.

In operation, mower height may be adjusted by clip 92 installation on or removal from the spindle portion between sleeve lower shoulder 72 and spindle collar upper shoulder 76. During installation, as the mouth opening 124 of clip 92 is forced to transversely receive spindle 39, the arms 96 yieldably flex radially outward as shown in FIG. 6. Once interior edges 116 pass spindle center (coinciding with 39), the clip arms 96 cam themselves in position around spindle periphery 39b and are held there by their own resiliency. Removal of clip 92 simply requires that this process be reversed.

If knobs 104 are provided, removal of clip 92 from spindle 39 is started and assisted by compressing knobs 104 together, as shown in FIG. 5, to spread arms 39 radially outward as spindle 39 is drawn through mouth opening 124.

It will be appreciated that clip 92 can be used with any caster wheel assembly, or the like, to adjust the distance between the wheel and the sleeve associated with the wheel spindle, or its equivalent.

It will be further appreciated by one skilled in the art that the range of values for clip 92 dimensions designated by the numerals 92a, 92d, 92f, 92g, 92h, 92i, 92j, 92k and 92l will vary depending upon the durameter value of the clip material of construction. The clip is advantageously configured so that no matter what durameter value chosen for construction material, the clip is soft enough to allow installation and removal from the spindle by hand, but hard enough to maintain retention of the clip on the spindle without substantial deformation during compression and impact loading associated with operation under varying weather conditions. It will be further appreciated that the wrap-around circumference 108a necessary to facilitate clip 92 installation and removal by hand, as well as camming and resilient action of arms (as discussed above), is directly, though not exclusively, related to the durameter value of the clip as well as the thickness of the spreadable arms (e.g., wall thickness 92g on clip 92).

We claim: claims:

1. In a mobile device having a height-adjustable, wheeled frame, the improvement comprising:

at least one ground-engageable wheel assembly including an upright member received by the frame in a manner to permit selective up and down, height-adjusting movement of the frame relative to the member;

a lower shoulder on said member;

an upper shoulder on said frame moveable toward and away from said lower shoulder during height adjustment of the frame; and at least one removable spacer clip on said member between the shoulders for holding the frame against downward movement below a selected height position, said clip including a pair of mutually opposed, resiliently spreadable arms interconnected at one end and disconnected at an opposite end for embracing said member when the clip is installed thereon, yet permitting the arms to yieldably flex toward and away from one another as the clip is forced transversely off and on the member.

2. The apparatus of claim 1, said opposite ends of said spreadable arms cooperating to define a mouth opening being sufficiently wide to permit installation and removal of said clip on said member by hand.

3. The apparatus of claim 1, said opposite ends of said spreadable arms cooperating to define a mouth opening being sufficiently shallow so that upon installation, said arms cam themselves in position around said member and hold said clip around said member by said arms.

4. The apparatus of claim 1, said arm resiliency effective to permit installation and removal of said clip on and from said member by hand.

5. The apparatus of claim 1, said arm resiliency effective to permit a camming action of said arms around said upright member during installation so that said arms hold said clip in position on said member once installed.

6. The apparatus of claim 1, said arms being separated at said interconnected end by a resilient back portion flexibly cooperating with said arms to permit installation and removal of said clip on and from said member by hand.

7. A snap-on clip apparatus for height adjustment of a mobile frame having a caster wheel assembly including an upright member presenting a cross-sectional dimension, said member being received by the frame in a manner to permit selective up and down, height adjustment movement of the frame relative to said member, the apparatus comprising:

a clip back portion having a pair of mutually opposed, resiliently spreadable arms integrally formed at one end with and extending outwardly from said back portion, said arms being disconnected at opposite ends to define a mouth opening smaller than the cross-sectional dimension of said member for embracing said member when said clip is installed thereon, yet permitting said arms to yieldably flex toward and away from one another, wherein the arms are resiliently spreadable to sufficiently widen the mouth opening so that the member passes transversely between the arms during installation and removal of the clip.

8. The apparatus of claim 7, said clip arms and back portion cooperating to define a generally C-shaped, annular interior surface and mouth opening between said arms, said interior surface having wrap-around circumference of about 60–90% of the upright member circumference.

9. The apparatus of claim 8, said arms having a thickness of about 25–45% of the diameter of said C-shaped annular interior surface of said clip.

10. The apparatus of claim 8, said center back portion having a thickness of 25–35% of the diameter of said annular interior surface.

11. The apparatus of claim 8, the circumference of said annular interior surface being 60–90% of the circumference of said upright member.

12. A snap-on clip apparatus for height adjustment of a mobile frame having a caster wheel assembly including an upright member received by the frame in a manner to permit selective up and down, height adjustment movement of the frame relative to said member, the apparatus comprising:

a clip back portion having a pair of mutually opposed, resiliently spreadable arms integrally formed at one end with and extending outwardly from said back portion, said arms being disconnected at opposite ends for embracing said member when said clip is installed thereon, yet permitting said arms to yieldably flex toward and away from one another as the member passes transversely between the arms during installation and removal of the clip, said clip further including a pair of mutually opposed, resiliently compressible knobs integral with and extending outwardly from said back portion in a direction opposite said arms for expanding said arms when said knobs are compressed by hand.

13. The apparatus of claim 12, said knobs being separated by a distance of 25–33% of the diameter of said C-shaped annular interior surface of said clip.

14. A spacer clip having a generally C-shaped, unitary body that includes:

a pair of mutually opposed, resiliently spreadable arms;

an integral connection between the arms at one end thereof, said arms being disconnected from one another and spaced apart at an opposite end of the arms to define an entry mouth;

a first load-bearing surface on a top face of the body extending along the arms;

a second load-bearing surface on a bottom face of the body extending along the arms; and a hole defined between said arms extending entirely through said body from said top face to said bottom face, said entry mouth communicating with said hole adjacent said opposite end of the arms to permit the clip to be installed on and removed from a shaft by spreading of the arms as the shaft moves into and out of the hole through the entry mouth, said clip further including a pair of mutually opposed, resiliently compressible knobs integral with and extending outwardly from said connection, said knobs operatively coupled with said arms so that when said knobs are compressed said arms spread.

15. The spacer clip of claim 14, said body being formed of an elastomeric material.

16. The spacer clip of claim 15, said body being formed of a resilient and durable material having durameter values between about 80–87.

17. The spacer clip of claim 14, said hole being generally circular.

18. The spacer clip of claim 17, said hole having a constant radius from said top face to said bottom face.

19. A set of spacer clips including at least a pair of generally C-shaped, unitary bodies that include:

a pair of mutually opposed, resiliently spreadable arms on each body;

an integral connection on each body between the arms at one end thereof, said arms being disconnected from one another and spaced apart at an opposite end of the arms to define an entry mouth;

a first load-bearing surface on a top face of each body extending along the arms;

a second load-bearing surface on a bottom face of each body extending along the arms; and a hole in each body defined between said arms extending entirely through the body from said top face to said bottom face, said entry mouth communicating with said hole adjacent said opposite end of the arms to permit the clip to be installed on and removed from a shaft by spreading of the arms as the shaft moves into and out of the hole through the entry mouth, wherein the distance between said top face and said bottom face defines the thickness of each of said bodies, the thickness of one of said pair of bodies being different than the thickness of the other of said pair of bodies.

\* \* \* \* \*